United States Patent
Warner et al.

[11] Patent Number: 5,848,918
[45] Date of Patent: Dec. 15, 1998

[54] ELECTRICAL APPLIANCE WITH NOVEL ELECTRICAL POWER CONNECTOR STRUCTURE

[75] Inventors: Robin L. Warner, Mt. Holly Springgs; David B. Finkenbinder, Newville; Gary Biddle, Carlisle, all of Pa.

[73] Assignee: General Signal Corporation, Stamford, Conn.

[21] Appl. No.: 789,915

[22] Filed: Jan. 28, 1997

[51] Int. Cl.⁶ ................................................. H01R 13/432
[52] U.S. Cl. ............................................................ 439/746
[58] Field of Search .................................. 439/746, 747, 439/748, 749, 872

[56] References Cited

U.S. PATENT DOCUMENTS

| | | | |
|---|---|---|---|
| 2,768,361 | 10/1956 | Aquillon et al. | 439/748 |
| 3,656,093 | 4/1972 | Kinkaid | 439/872 |
| 4,083,573 | 4/1978 | Hillyer et al. | 310/71 |
| 4,390,231 | 6/1983 | Plyler et al. | 439/872 |
| 4,580,341 | 4/1986 | Chapelot | 439/747 |
| 4,868,905 | 9/1989 | Viscusi | 310/71 |

*Primary Examiner*—Gary F. Paumen
*Attorney, Agent, or Firm*—Ohlandt, Greeley, Rugiero & Perle

[57] ABSTRACT

A connector apparatus for an electrical appliance which includes a body having first and second spaced opposed faces. The body has a slot defined therein that passes completely through the body between the first and second opposed faces thereof. The slot has first and second spaced and opposed faces. The connector includes a generally planar metallic lug having first and second sides. The lug has at least first and second projections extending therefrom. The projections engage the body when the lug is disposed within the slot. In some forms of the invention the lug includes a third projection and the third projection also engages the body when the lug is disposed in the slot. The lug and the slot may be elongated and the respective directions of elongation may be substantially aligned when the lug is disposed within the slot. The first projection is a spring member such as a leaf spring that is elongated and the direction of elongation is generally aligned with the direction of elongation of the lug in some forms of the invention. The second and third projections may be generally planar and the second and third projection may be generally parallel. The second and third projections are disposed on opposed sides of the elongated lug, the lug is manufactured of sheet metal and the first projection is stamped from the lug, the first projection has a first side that is a free end thereof, two opposed elongated sides and a fourth side that is common to both the lug and the first projection in some forms of the invention. The fourth side may be further from the second and third projections than the free end.

15 Claims, 6 Drawing Sheets

ELECTRICAL APPLIANCE WITH NOVEL ELECTRICAL POWER CONNECTOR STRUCTURE

RELATED APPLICATIONS

This application is being filed simultaneously with two other applications having the same inventors and the same assignee as this application. The applications are entitled *End Bracket Construction for Small Electric Motors* U.S. Ser. No. 08/789,144 and *Small Electric Motor with Airflow Guide Structure,* U.S. Ser. No. 08/789,142.

BACKGROUND OF THE INVENTION

The invention relates to electric appliances such as electric motors and particularly to the manner of installing and connecting the electric leads or terminations supplying electric power to such devices. While the invention has particular application to small and inexpensive motors used for various applications, such as electric vacuum cleaners, it will be understood that the invention also has application to a wide variety of other electric motors as well as other electrical devices in which it is desired to quickly secure electrical connections.

In the case of vacuum cleaners it is common for the motor and fan assembly to be manufactured in a first factory and the remaining parts of the vacuum cleaner to be manufactured in a second factory. Accordingly, it is desirable to provide a positive connection between the respective parts that is achieved easily and rapidly.

Early prior art constructions relied on terminations that were spliced and soldered onto each of the respective extremities of the motor winding. Later prior art constructions used poke-in terminal constructions such as that described in U.S. Pat. Nos. 4,038,573 and 4,868,905 which are owned by the assignee of the present application. More recent prior art constructions have been designed with automatic field termination (AFT). Automatic field termination typically is characterized by a small printed circuit board, referred to as the AFT board, which is usually connected to the extremities of the field winding by an insulation displacement method. The AFT board is dimensioned and configured for mating engagement with an industry standard connector. Automatic field termination boards are suitable for many applications, however, the cost of the board and the cost of installing the board are expenses which add to the total cost of the motor and fan assembly. Attempts to construct connectors that cooperate with the injection molded plastic resin parts of the assembly are complicated by the limitations of the injection molding process. It would be simple to mold a relatively large slot in a molded part of the motor and fan assembly and then provide a relatively large terminal lug that would slide into and engage the walls of the relatively large slot in the molded part. This is not satisfactory because it would be inordinately expensive to manufacture such a large terminal lug.

While it is possible to manufacture an injection molded part having a very narrow slot, such an approach has an unacceptable trade off with respect to mold life. More specifically, the process for molding a slot in a part manufactured by an injection molding process requires a mold that has a leaf or fin shaped member that creates the slot or void in the molded part. As the size of the leaf or fin becomes smaller the life of the mold becomes shorter. Thus, a mold having the capability of molding a very thin slot would have an unacceptably short life.

SUMMARY OF THE INVENTION

It is an object of the invention to provide terminations in an electrical device which does not include an automatic field termination board and which does provide at least two connectors dimensioned and configured for mating engagement with another electrical device.

Another object of the invention is to provide a motor and fan assembly that will engage electrically another subassembly.

Still another object of the invention is to provide a connection that will function as easily, quickly and positively as the ordinary household electrical appliance plug and the ordinary household electrical receptacle that are routinely used to connect electrical appliances.

Yet another object of the invention is to provide a connection that, at least in part, is molded into a part of the motor and fan assembly.

Another object of the invention is to provide a construction (1) in which a part thereof will be capable of being injection molded in a mold that will have a reasonable life span and (2) in which the terminal cooperating therewith will have a relatively small size and thus a relative small cost.

It has now been found that these and other objects of the invention may be achieved in a connector apparatus for an electrical appliance which includes a body having first and second spaced opposed faces. The body has a slot defined therein that passes completely through the body between the first and second opposed faces thereof. The slot has first and second spaced and opposed faces. The connector includes a generally planar metallic lug having first and second sides. The lug has at least first and second projections extending therefrom. The projections engage the body when the lug is disposed within the slot.

In some forms of the invention the lug includes a third projection and the third projection also engages the body when the lug is disposed in the slot. The lug and the slot may be elongated and the respective directions of elongation may be substantially aligned when the lug is disposed within the slot. The first projection is a spring member such as a leaf spring that is elongated and the direction of elongation is generally aligned with the direction of elongation of the lug in some forms of the invention.

The second and third projections may be generally planar and the second and third projection may be generally parallel. The second and third projections are disposed on opposed sides of the elongated lug, the lug is manufactured of sheet metal and the first projection is stamped from the lug, the first projection has a first side that is a free end thereof, two opposed elongated sides and a fourth side that is common to both the lug and the first projection in some forms of the invention. The fourth side may be further from the second and third projections than the free end.

The first wall of the slot has a first step shaped recess dimensioned and configured for engagement with the detent, the first step shaped recess abuts a plane that is coplanar with the first side of the body, the first wall of the slot has a second step shaped recess that abuts a plane that is coplanar with the second side of the body, and the first step shaped recess abuts a plane that is coplanar with the first face of the slot in some forms of the invention. The second step shaped recess abuts a plane that is coplanar with the first face of the slot, the first step shaped recess and the detent are dimensioned and configured to result in a lateral force acting on the lug to urge the lug toward the second face of the slot, the second step shaped recess and the second and third projections are dimensioned and configured to urge the lug toward the second face of the slot, the first step shaped recess is dimensioned and configured for snug abutment with the elongated sides of the first projection in various forms of the invention. In addition the the second step shaped recess may be dimensioned and configured for snug abutment with outer faces of the second and third projections from the lug.

BRIEF DESCRIPTION OF THE DRAWING

The invention will be better understood by reference to the accompanying drawing in which.

DESCRIPTION OF THE PREFERRED EMBODIMENT

Figure 1:
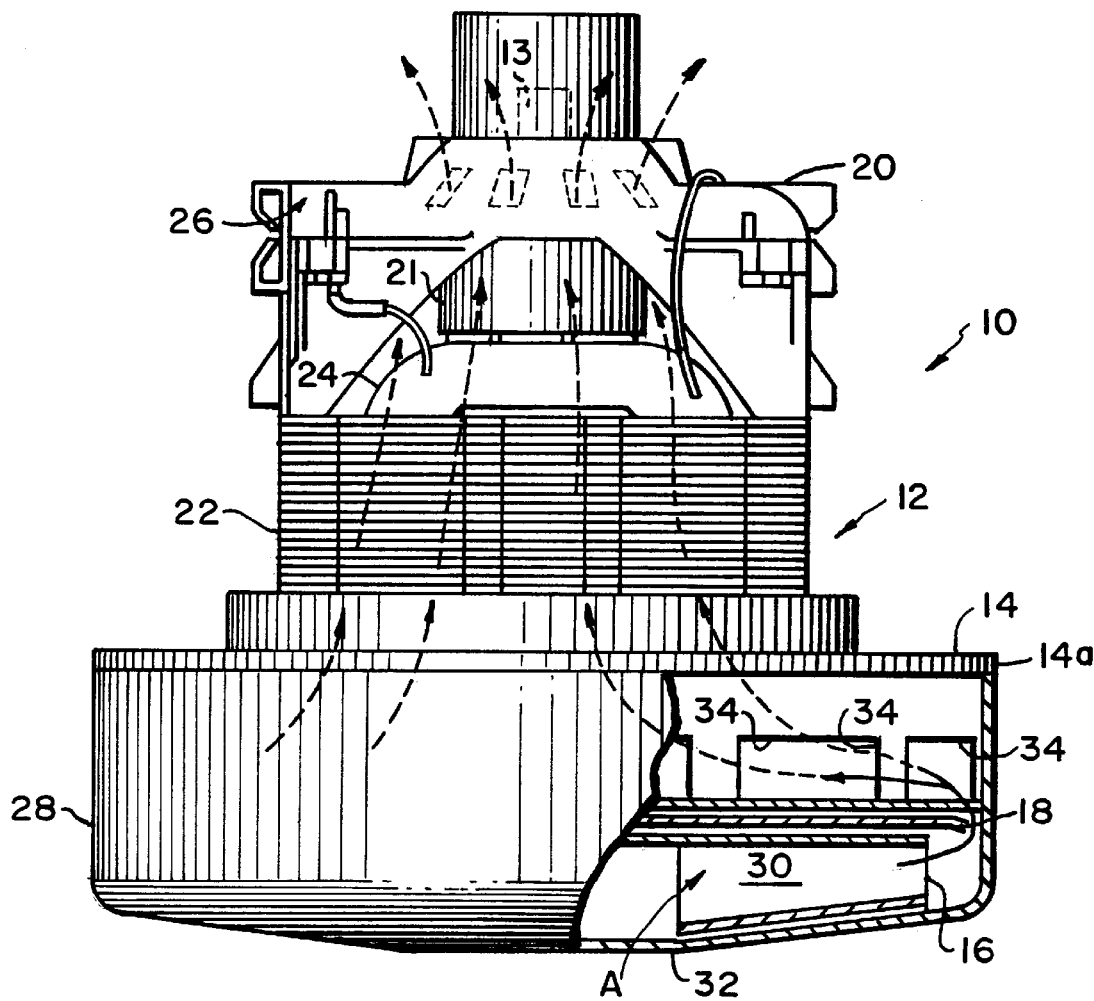
FIG. 1 is partially broken away, partially schematic elevational view of a fan and motor assembly which incorporates the present invention.
Figure 2:
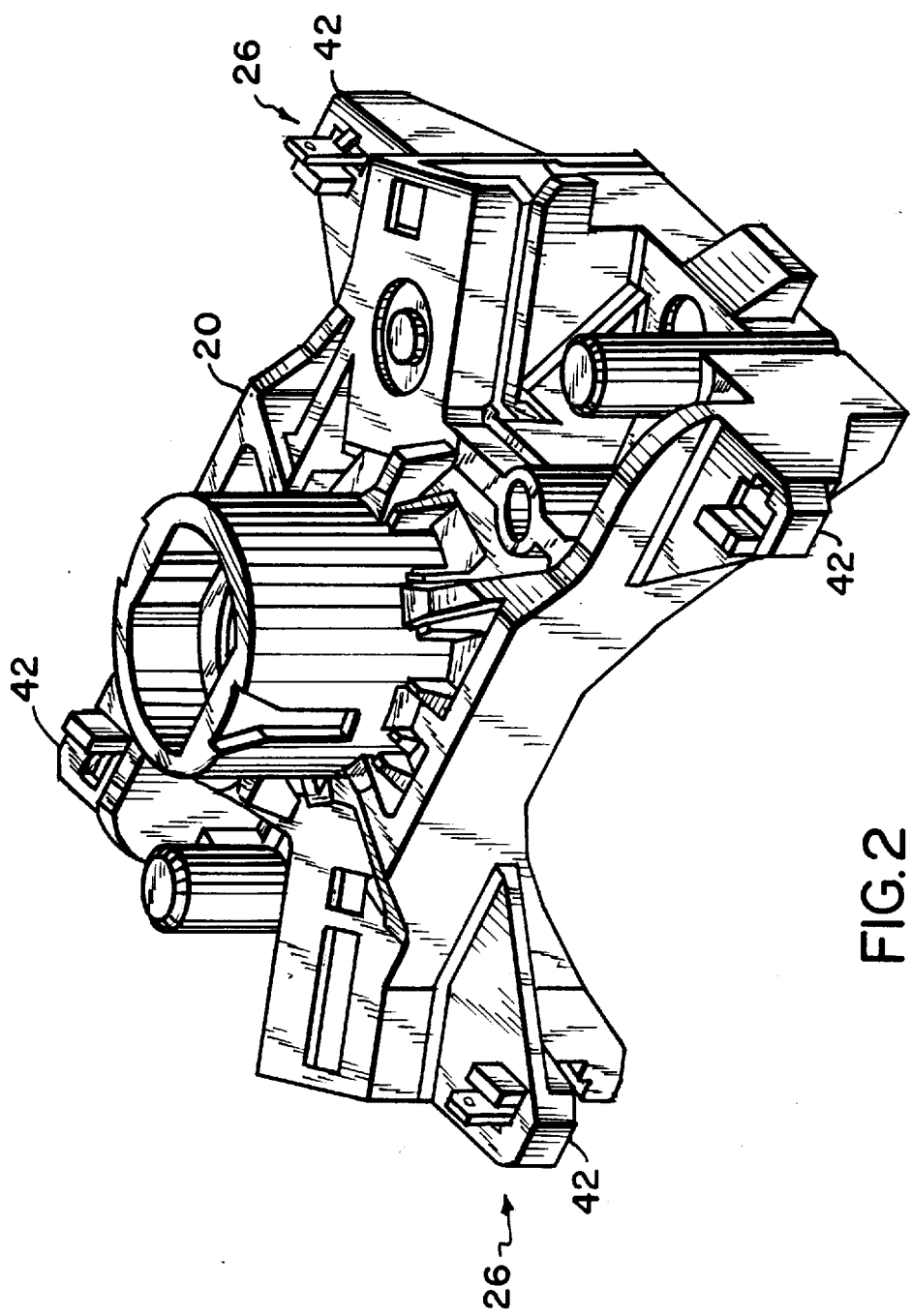
FIG. 2 is an isometric view of the motor end bracket shown in FIG. 1.
Figure 3:
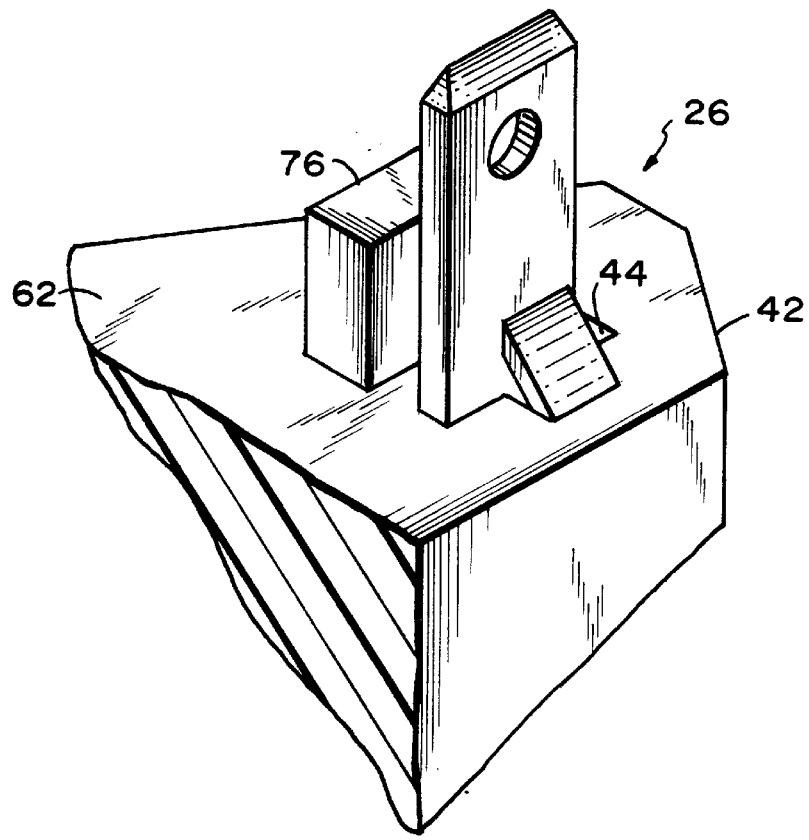
FIG. 3 is a fragmentary isometric view of a portion of a terminal part of the motor end bracket shown in FIG. 2 together with a spade shaped terminal lug engaged with a slot in the motor end bracket.
Figure 4:
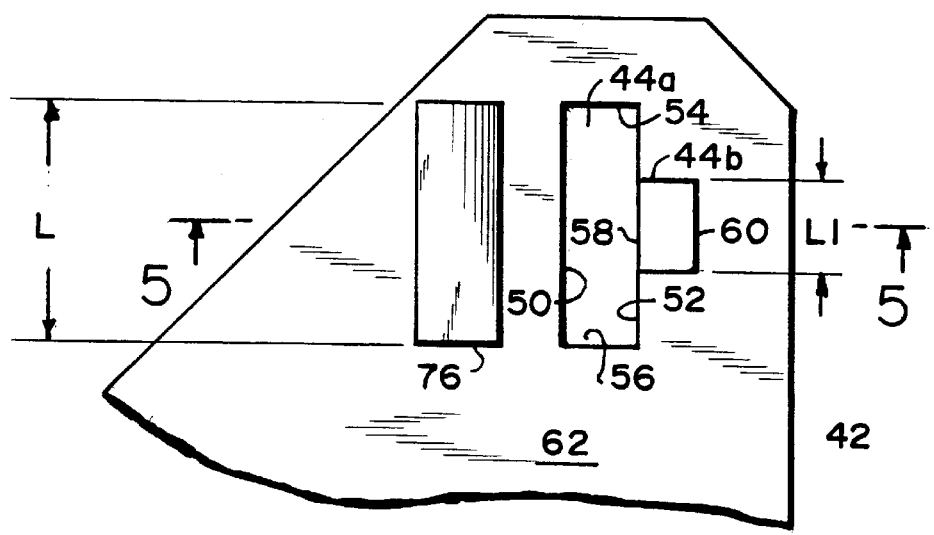
FIG. 4 is a plan view of the terminal part of the motor end bracket shown in FIG. 3 which does not include the spade shaped terminal lug.

Referring now to FIG. 1 there is shown a motor and fan assembly 10 that includes a motor 12, a housing 14, an impeller 16 and a circular plate 18. The motor 12 has a shaft 13 (shown in dotted line in FIG. 1) on which the impeller 16 is carried whereby rotation of the shaft 13 causes rotation of the impeller 16. The shaft 13 is supported by a first bearing (not shown) carried by the housing 14 and a second bearing (not shown) carried by a motor end bracket 20. The motor 12 includes laminations 22, a winding 24, terminations 26 (one shown in FIG. 1) and a commutator 21. A pan shaped cover 28 extends around the periphery of the impeller 16, the plate 18 and part of the housing 14. More specifically, the cover 28 abuts against a lip 14a on the housing 14. The impeller 16, disposed within the pan shaped cover 28, includes a plurality of generally radial vanes 30. Ambient air A is drawn into the motor and pan assembly 10 through a central circular opening 32 and forced to the periphery of the impeller 16. The circular plate 18 obstructs flow upward except around the periphery of the plate 18. This upward flow around the periphery of the plate 18 is directed by a plurality of generally radial curved vanes 34 that are molded as an integral part of the housing 14. The flow of air A is directed between the vanes 34 that in combination with other surfaces in the housing 14 direct the flow of the air A over the surfaces of the laminations 22, the winding 24 and the surface of the commutator 21. In the preferred embodiment the housing 14 is bolted to the motor end bracket 20. Thus, the laminations are clamped firmly against the laminations by the bolts engaging both the bracket 20 and the housing 14.

Referring now to FIGS. 2–10 there is shown the preferred form of the termination 26 in accordance with the present invention. The motor end bracket 20, in the preferred embodiment includes four ears or projections that extend from the central part of the body of the motor end bracket 20. Although only two of the termination's 26 are present in the preferred embodiment the molded motor end bracket 20 is provided with a slot 44 in each of the four ears or projections 42. Thus, although only two terminations 26 are necessary in the illustrated motor and fan assembly, four slots are normally molded into each motor end bracket 20. Accordingly, the same motor end bracket 20 may be used for different applications without the necessity for machining a new mold.

Each ear or projection 42 has, in the preferred embodiment, a planar upper face 60 and a planar bottom face 62. The face 60 is parallel to the face 62. The shape of the slot 44 that is a part of each termination is best seen in FIGS. 3–5 and 7–9. In the preferred embodiment, each slot 44 is an ordinary slot which in addition has first and second step shaped recesses extending from one side wall of the ordinary slot. For the purpose of description the slot 44 will be described in terms of (1) a plain slot 44a, (2) a first step shaped recess 44b extending from a side wall of the plain slot 44a and (3) a second step shaped recess 44c extending from the same side wall of the plain slot 44a. It will be understood that the first and second step shaped recesses 44b, 44c are really part of the same slot. The complexity of the geometry of the slot 44 necessities a description that describes individually the three discrete contiguous slots 44a, 44b, 44c that collectively are the slot 44 in each ear or projection 42.

More particularly, for purposes of description each slot 44 may best be visualized as a slot 44a having opposed (1) first and second planar parallel walls 50, 52 and (2) third and fourth parallel planar walls 54, 56 that are each perpendicular to the first and second planar parallel walls 50, 52. The length (measured in the plan view of FIG. 4) of the walls 50, 52 is greater than the length of the walls 54, 56.

For purposes of description, a first step shaped recess or slot 44b is disposed in the wall 52 of the slot 44a. The recess 44b has a length L1 measured in the plan view of FIG. 4. In the preferred embodiment the recess 44b has walls 58, 60 parallel to the wall 52 having a length L1 measured in the plan view of FIG. 4. The length L1 is less than the length L of the slot 44a. The slot 44b abuts the imaginary extension of the planar face 60.

Figure 5:
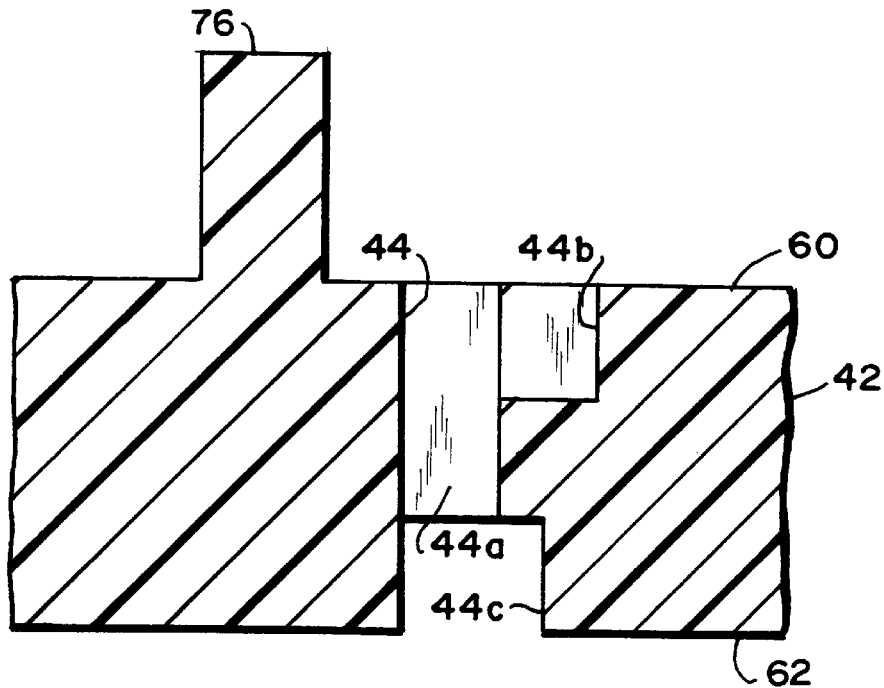
FIG. 5 is a sectional view taken along the line 5—5 of FIG. 4.
Figure 10:
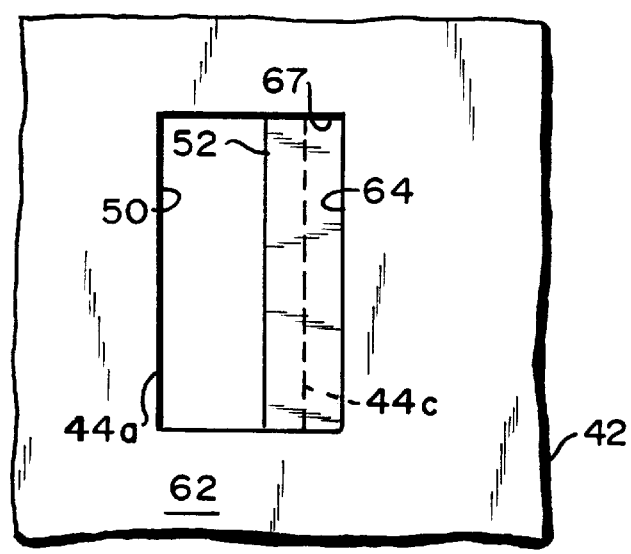
FIG. 10 is a fragmentary bottom view of the slot that appears in FIGS. 4 and 5.

As best seen in FIGS. 5 and 10 a second step shaped recess or slot 44c is disposed in the wall 52 of the slot 44a. The recess 44c is bounded by the planar face 62 as well as the imaginary extension of the wall 52 of the slot 44a. In the preferred embodiment the length (measured in the bottom view of FIG. 10) of the slot 44c is equal to the length of the slot 44a. As used herein, the term "length" used in reference to slots 44a, 44b, and 44c refer to a dimension in the plane of the face 60 or 62 of the ear 42 or a plane parallel to one of these planes.

Figure 6:
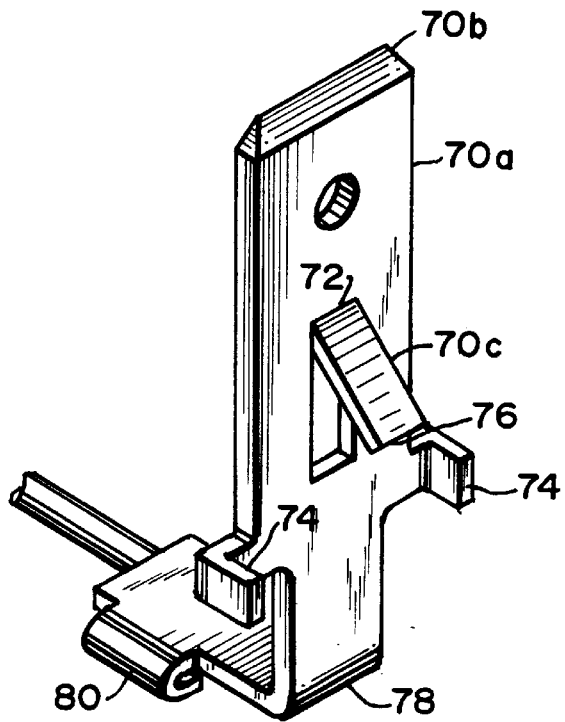
FIG. 6 is an isometric view of the terminal lug that is partly visible in FIGS. 1, 2 and 3.

Referring specifically to FIG. 6 there is shown the lug 70 that together with the body having the slot 44 comprises the connector 26 in accordance with the preferred form of the present invention. The lug 70 has a generally planar spade shaped body with a tapered tip 70b to facilitate entrance into the slot 44. A detent 70c is provided by a stamping operation which stamps three sides of an elongated rectangle shaped part of the spade shaped body and uses the forth side 72 as a hinge. In other words the forth side 72 NB is bent as the elongated rectangle shaped part is pushed into a position where it is disposed in oblique relationship to the generally planar spade shaped body. For some applications the lug 70 may be heat treated to provide adequate spring characteristics for the detent 70c.

The lug 70 has two standoffs or legs 74 that have the same length and are disposed nearer to the free end 76 of the elongated rectangle shaped detent 70c than to the hinge part 72 of the detent 70c. In the preferred form of the invention the lug 70 has a right angle bend 78 to facilitate insertion into the slot 44. Typically the preferred embodiment will utilize a crimped connector 80 to secure the end of the magnet wire in the winding 24 to the lug 70. A preferred form of the crimped connector is that manufactured by the Amp Incorporated of Harrisburg, Pa. and marketed under the trademark AMPLIVAR.

Figure 8:
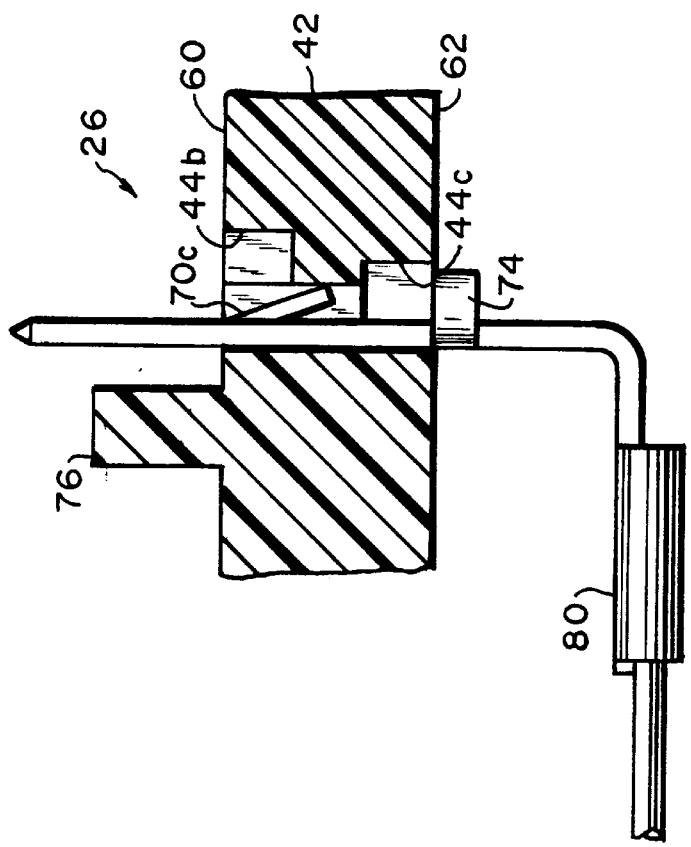
FIGS. 7, 8, and 9 are all sectional views similar to that of FIG. 5 which show sequentially the movement of the terminal lug shown in FIG. 6 into the cooperating slot in the motor end bracket.
Figure 7:
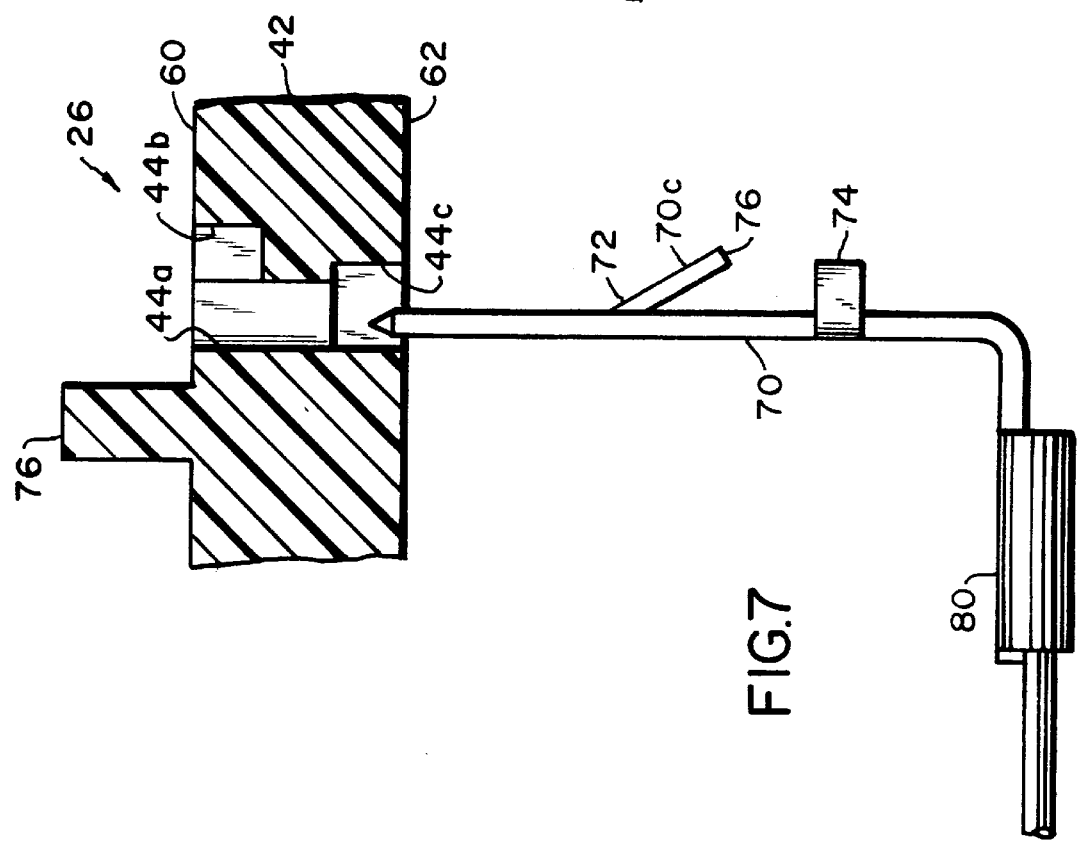
Figure 9:
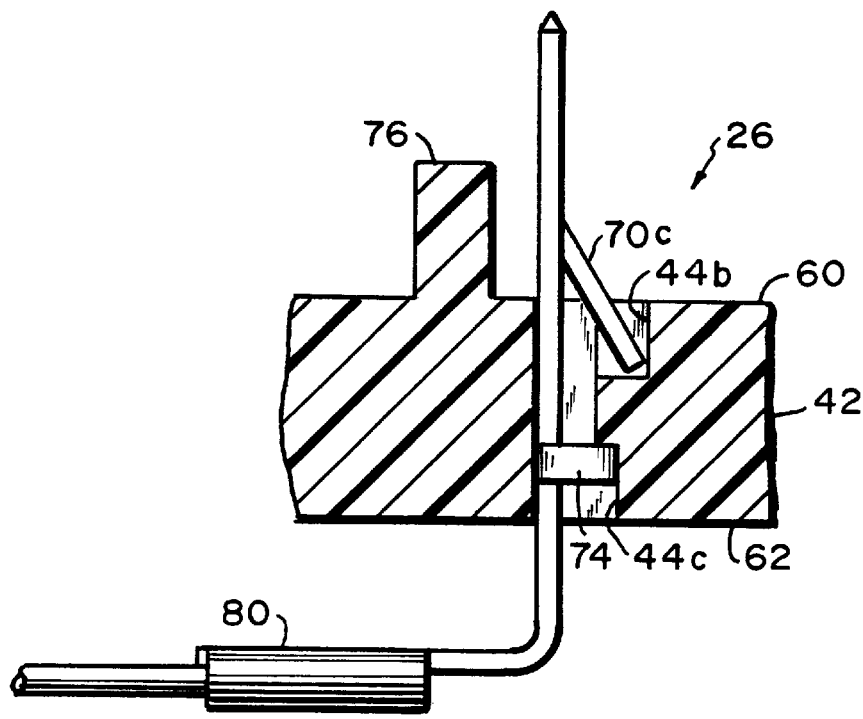

The assembly of the connector 26 is most apparent by reference to FIGS. 7–9. FIG. 7 illustrates the initial movement of the lug 70 into the slot 44. The slot may be considered to be a composite of side abutting, parallel adjacent slots 44a, 44b and 44c. Upon initial movement of the lug 70 into the slot 44 the detent 70c is bent to a position that more nearly approaches being coplanar with the rest of the lug 70. Before any stamping, the tab 70c is disposed in coplanar relationship with the sheet metal from which all of the lug 70 is stamped. Upon still further movement of the lug 70 into the slot 44, the legs 74, 74 slide into the recess 44c as is most apparent by reference to FIG. 9. In that position the legs 74 seat against the wall 64 of the recess 44c and force the lug 70 into planar face to planar face abutting relationship with the planar wall 50 of the slot 44a that is disposed in opposed relationship to the wall 64 of the slot 44c. In addition the outboard sides of the legs 74, 74 are disposed in side abutting relationship to the opposed walls 67, 69 of the slot 44c. This is in addition to the locking of the detent 70c in the recess 44b where the detent 70c prevents withdrawal of the lug 70 and in addition also urges the lug 70 into face abutting relationship with the wall 50. It will thus be seen that the legs 74, 74 function as standoffs with the free ends of the legs 74, 74 abutting the planar wall 64 of the slot 44 c to force a face of the lug 70 against the wall 50 of the slot 44a that is opposite to the slot 44a.

It will be seen that the detent 70c latches into the step shaped recess or slot 44b. This latching action prevents withdrawal of the lug 70 from the slot 44. In addition the detent 70c provides a positive lateral bias that forces the lug 70 toward the opposed wall 50. This insure a snug fit of the lug 70 in the slot 44. More particularly, the combination of the detent 70c and the two legs 74, 74 provide a snug and stable three point engagement between the lug 70 and the slot 44. It will be further seen that the lug 70 will have a very snug and secure fit even though the size of the lug 70 is substantially smaller than the size of the slot 44. Accordingly, the cost of the lug 70 is minimized because of the reduced size thereof and the cost of the housing is reduced because the mold in which the housing is manufactured has a relatively long service life.

Disposed next to the upstanding lug 70 is a flat post 76 that is dimensioned and configured for mating engagement with a connector (not shown). The post 76 registers the mating connector with the lug 70.

Although the preferred form of the invention has a structure that may be described as a slot having parallel, planar opposed walls and one of those walls has a step at one axial extremity of the slot for cooperation with the legs 74, 74 and that same wall has another step at the opposite axial extremity of the slot for cooperation with a detent 70c, it will be understood that the invention is not limited merely to the preferred form of the invention. For example, a less satisfactory form of the invention would have no recesses 44b and 44c. In this other form of the invention the detent 70c would engage is the top face 60 of the and the legs would the bottom face 62 of the ear 42.

For example, some forms of the will have merely a slot having parallel, planar opposed walls with no steps or recesses in the sidewall of the slot 70 for the detent 70c and no recess for the legs 74, 74. Thus, in such other forms of the invention the free ends of the legs 74, 74 touch the face 62 of the ear 42 and the detent 70c engages the upper face 60 of the ear 42. Because the detent 70c cannot provide the necessary lateral force to urge the lug 70 against the face 50 this embodiment is less satisfactory than the preferred embodiment. Obviously, such an embodiment would have a different spacing between the legs 74, 74 and the tang 70c than the embodiment described above.

Similarly, although the legs 74 have been formed in a stamping operation at the sides of the lug 70 it will be understood that in other forms of the present invention the legs may be located differently. For example, in an alternative embodiment a single leg (not shown) may be disposed directly below the detent 70c and that leg may slide within an elongated channel that extends "vertically" with respect to the illustrated ear 42 within the slot 44. Although the detent 70c is shown as a spring member to provide the necessary lateral bias, some other forms of the invention may have a rigid "bump" (not shown) and this may be sufficient for some applications particularly with very tight tolerance control.

The invention has been described with reference to its illustrated preferred embodiment. Persons skilled in the art of such devices may upon exposure to the teachings herein conceive other variations. Such variations are deemed to be encompassed by the disclosure, the invention being delimited only by the following claims.

We claim:

1. A connector apparatus for an electrical appliance comprising:

a body, said body having upper and bottom opposed faces, said body having a slot defined therein, said slot passing completely through said body between said upper and bottom opposed faces thereof, said slot having first and second opposed faces;

a first recess formed in said upper face and along said first face of said slot, a second recess formed in said bottom face and along said first face of said slot; and a metallic lug having first and second generally planar surfaces and first and second sides, said lug having first and second projections extending perpendicular from said first surface, said lug having a third projection extending outwardly from said first surface, said first and second projections engaging said second recess and said third projection engaging said first recess when said lug is disposed within said slot.

2. The apparatus as described in claim 1 wherein:

said lug is elongated, said slot is elongated and the respective directions of elongation are substantially aligned when said lug is disposed within said slot.

3. The apparatus as described in claim 2 wherein:

said third projection is a spring member.

4. The apparatus as described in claim 3 wherein:

said third projection is a leaf spring.

5. The apparatus as described in claim 4 wherein:

said leaf spring is elongated and the direction of elongation is generally aligned with the direction of elongation of said lug.

6. The apparatus as described in claim 5 wherein:

said first and second projections are generally planar.

7. The apparatus as described in claim 6 wherein:

said first and second projection are generally parallel.

8. The apparatus as described in claim 7 wherein:

said first and second projections are disposed on said first and second sides of said elongated lug, respectively.

9. The apparatus as described in claim 8 wherein:

said lug is manufactured of sheet metal and said third projection is stamped from said lug.

10. The apparatus as described in claim 9 wherein:

said third projection has a first side that is a free end thereof, two opposed elongated sides and a fourth side that is common to both said lug and said first projection.

11. The apparatus as described in claim 10 wherein:

said fourth side is further from said first and second projections than are said free end.

12. The apparatus as described in claim 1 wherein:

said first recess and said leaf spring are dimensioned and configured to result in a lateral force acting on said lug to urge said lug toward said second face of said slot.

13. The apparatus as described in claim 12 wherein:

said second recess and said first and second projections are dimensioned and configured to urge said lug toward said second face of said slot.

14. The apparatus as described in claim 13 wherein:

said first step shaped recess is dimensioned and configured for snug abutment with the elongated sides of said first projection.

15. The apparatus as described in claim 14 wherein:

said second step shaped recess is dimensioned and configured for snug abutment with outer faces of said second and third projections from said lug.

* * * * *